United States Patent [19]

Lin

[11] Patent Number: 5,103,861
[45] Date of Patent: Apr. 14, 1992

[54] SEALING MEANS FOR A TWO-STAGE GAS REGULATOR FOR LIQUEFIED-GAS CONTAINERS

[75] Inventor: Chih S. Lin, Taipei, Taiwan

[73] Assignee: Chen Fong Enterprise Co., Ltd., Taipei, Taiwan

[21] Appl. No.: 748,095

[22] Filed: Aug. 21, 1991

[51] Int. Cl.⁵ .............................................. G05D 16/02
[52] U.S. Cl. ........................ 137/505.12; 137/505.46; 137/607
[58] Field of Search ............... 137/505.12, 505.46, 137/607, 375

[56] References Cited

U.S. PATENT DOCUMENTS 1,930,590  10/1933  Ebinger ..................... 137/505.12 X
4,802,507   2/1989  Willson ..................... 137/505.12 X Primary Examiner—Stephen M. Hepperle
Attorney, Agent, or Firm—Gifford, Groh, Sprinkle, Patmore and Anderson

[57] ABSTRACT

A two-stage gas regulator for liquefied-gas containers includes a lower body and an upper cover with a mediate plate disposed therebetween. The lower body has a plurality of inlet ports respectively in fluid communication with a corresponding liquefied-gas container, a first pressure-reduction chamber selectively in fluid communication with one of the inlet ports under control of a switch, a second pressure-reduction chamber in fluid communication with the first pressure-reduction chamber, and an outlet port in fluid communication with the second pressure-reduction chamber and a gas stove. The mediate plate has a first opening and a second opening respectively in alignment with the first and second pressure-reduction chambers. A first membrane is provided in the first pressure-reduction chamber to cover the first opening, and a second membrane is provided in the second pressure-reduction chamber to cover the second opening and for operating a secondary pressure reduction. A flange protrudes from a periphery of the second opening and is received in a receptacle formed in the upper cover. A seal is provided around the flange for preventing fluid in the upper cover from entering the second pressure-reduction chamber.

1 Claim, 7 Drawing Sheets

SEALING MEANS FOR A TWO-STAGE GAS REGULATOR FOR LIQUEFIED-GAS CONTAINERS

BACKGROUND OF THE INVENTION

The present invention relates to a sealing means for a two-stage gas regulator for liquefied-gas containers, and more particularly to a sealing means for a two-stage gas regulator which prevents damage to articles and/or injury to persons resulting from inappropriate pressure reduction of liquefied gas.

Generally, a two-stage gas regulator provides pressure reduction of liquefied gas for two liquefied-gas containers and provides visual indication, reminding that one of the containers has run out of liquefied gas. The two-stage gas regulator comprises two inlet ports respectively connected to one of the liquefied-gas containers, a first pressure-reduction chamber, a second pressure-reduction chamber, and an outlet port in fluid communication with a gas stove or the like. A first membrane is provided in the first pressure-reduction chamber for sealing, and a second membrane is provided in the second pressure-reduction chamber for operating a secondary pressure reduction.

For security, liquefied gas from either of the liquefied-gas containers must pass through the two pressure-reduction chambers before exiting the outlet port, providing a lower-pressure liquefied gas for cooking. However, if the first membrane malfunctions due to wear or abrasion, the liquefied gas exits the outlet port without being appropriately reduced in pressure in the second pressure-reduction chamber, because, although the pressure of the liquefied gas has been reduced, the pressure of the liquefied gas is still too high when leaving the outlet port. Since the pressure of the liquefied gas is not properly reduced, when igniting, a sudden unexpected blaze may cause damage to articles or injury to persons near the gas stove.

The present invention provides a sealing means for a two-stage gas regulator for liquefied-gas containers to prevent damage to articles or injury to persons.

SUMMARY OF THE INVENTION

According to one aspect of the present invention, a two-stage gas regulator for liquified-gas containers includes a lower body, an upper cover, and a mediate plate disposed therebetween. The lower body has a plurality of inlet ports respectively in fluid communication with a corresponding liquefied-gas container, a first pressure-reduction chamber selectively in fluid communication with one of the inlet ports under control of a switch, a second pressure-reduction chamber in fluid communication with the first pressure-reduction chamber, and an outlet port in fluid communication with the second pressure-reduction chamber and a gas stove. The mediate plate has a first opening and a second opening respectively in alignment with the first and second pressure-reduction chambers. A first membrane is provided in the first pressure-reduction chamber to cover the first opening, and a second membrane is provided in the second pressure-reduction chamber to cover the second opening and for operating a secondary pressure reduction. The present invention is characterized in that a flange protrudes from a periphery of the second opening and is received in a receptacle formed in the upper cover. A seal is provided between the flange and the receptacle for sealing.

Accordingly, it is a primary object of the present invention to provide a sealing means for a two-stage gas regulator for liquefied-gas containers for preventing damage to articles and/or injury to persons resulting from inappropriate pressure reduction of liquefied gas.

This and additional objects, if not set forth specifically herein, will be readily apparent to those skilled in the art from the detailed description provided, with appropriate reference to the accompanying drawings.

DETAILED DESCRIPTION OF THE PREFERRED EMBODIMENTS

Figure 1:
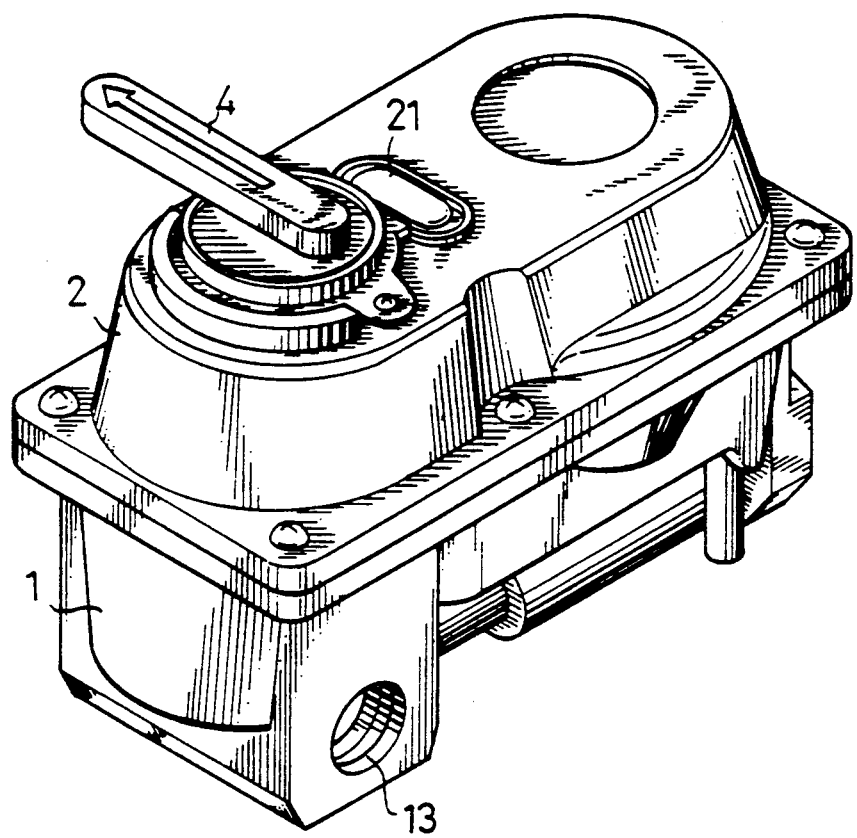
FIG. 1 is a perspective view of a two-stage gas regulator for liquefied-gas containers in accordance with the present invention.
Figure 2:
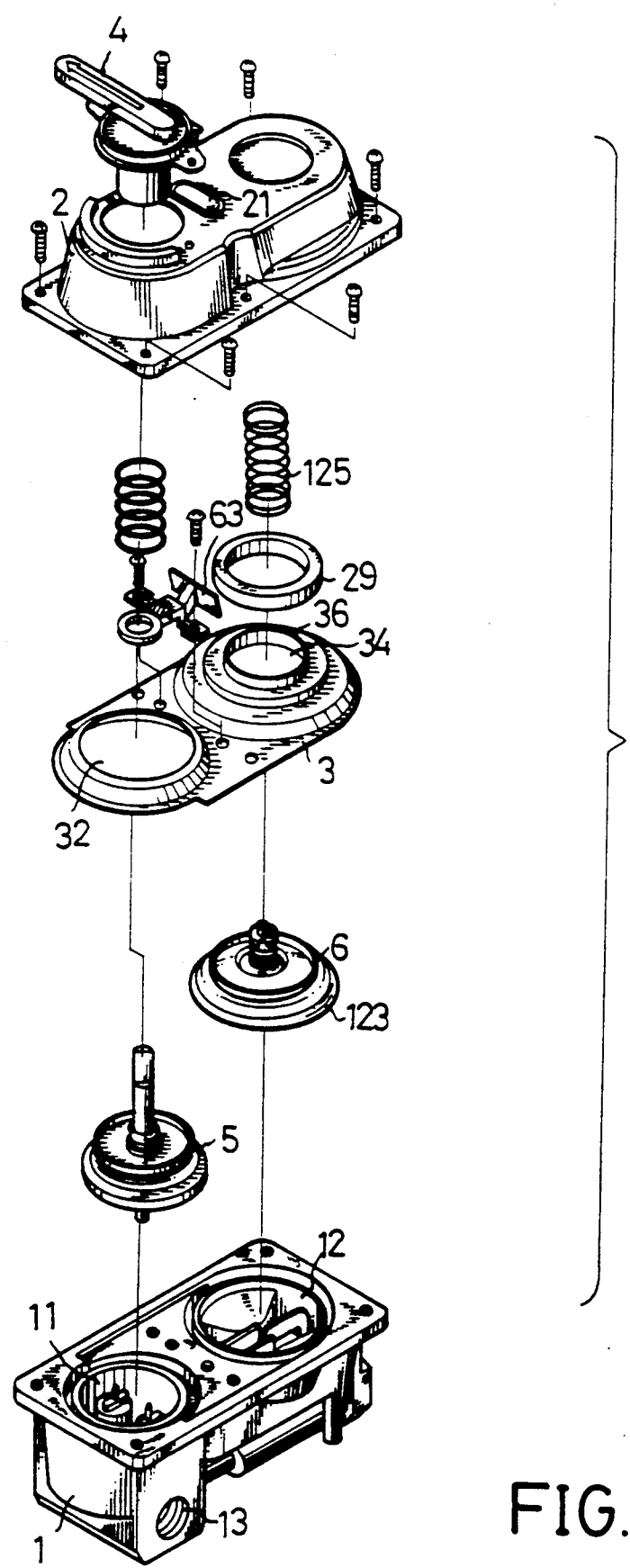
FIG. 2 is an exploded perspective view of the two-stage gas regulator of FIG. 1.
Figure 3:
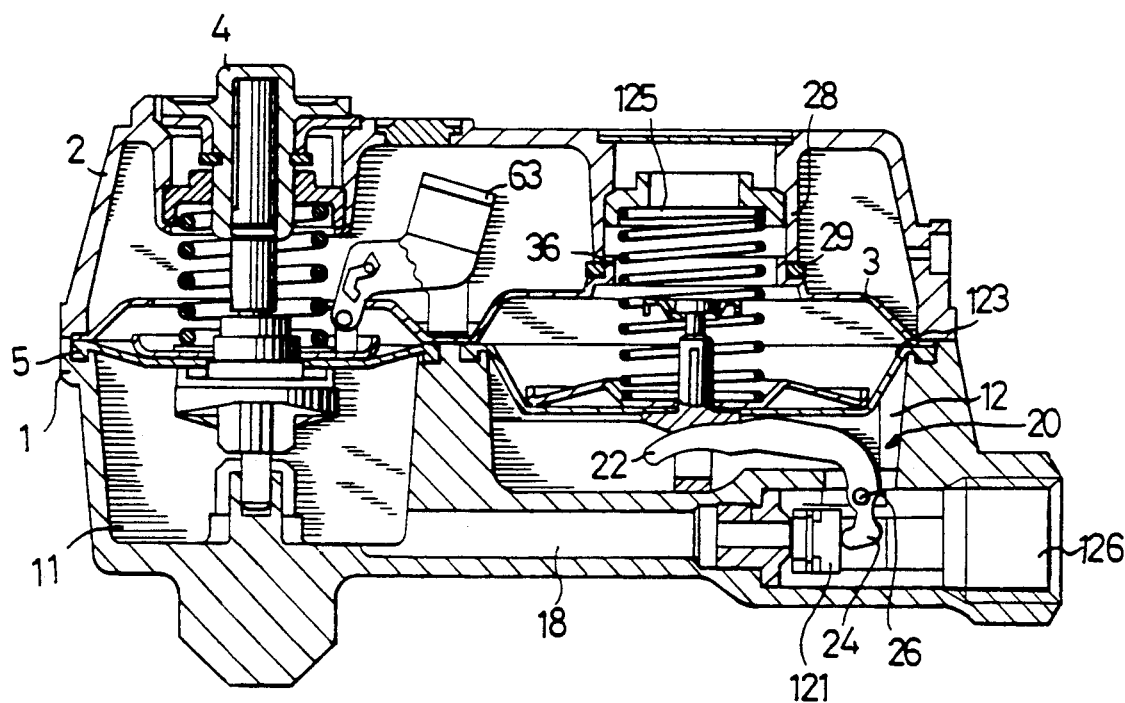
FIG. 3 is a cross-sectional view of the two-stage gas regulator, wherein a second pressure-reduction chamber is not in fluid communication with a first pressure-reduction chamber.

Referring to the drawings and initially to FIGS. 1, 2, and 3, a two-stage gas regulator for liquefied-gas containers generally comprises a lower body 1 and an upper cover 2 with a mediate plate 3 disposed therebetween. The lower body 1 has two inlet ports 13 (see FIG. 5) respectively in fluid communication with a liquefied-gas container (not shown), a first pressure-reduction chamber 11 in fluid communication with one of the inlet ports 13, a second pressure-reduction chamber 12 in fluid communication with the first pressure-reduction chamber 11 via a channel 18 in the lower body 1, and an outlet port 126 in fluid communication with the channel 18 at a first side thereof and in fluid communication with a gas stove (not shown) at a second side thereof. The upper cover 2 is recessed to receive elements therein, which will be described later. The mediate plate 3 has a first opening 32 and a second opening 34 respectively in alignment with the first and second pressure-reduction chambers 11 and 12.

Figure 5:
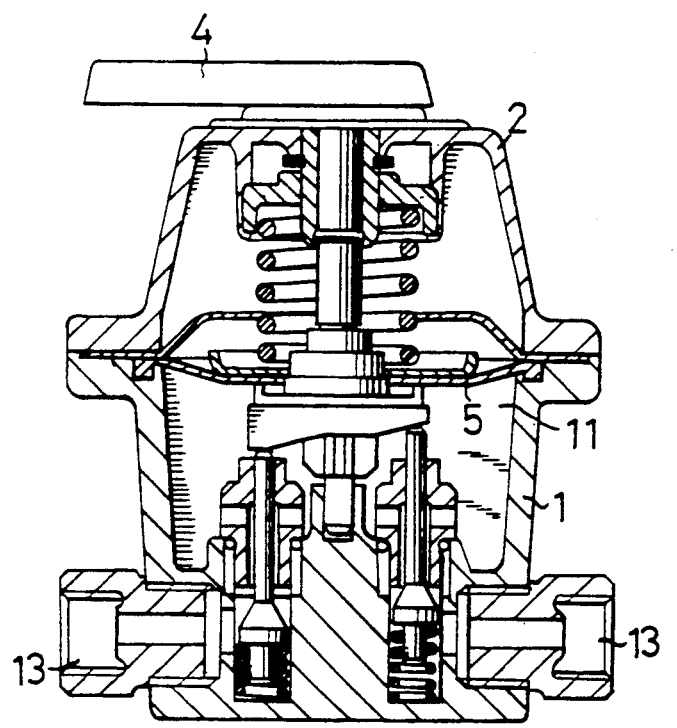
FIG. 5 is a cross-sectional view taken along line 5—5 in FIG. 1.

A switching assembly including a switch 4 is disposed in the first pressure-reduction chamber 11 for controlling fluid communication of the first pressure-reduction chamber 11 with either of a possible two liquefied-gas containers. As shown in FIG. 5, when the switch 4 is switched to a left side, the left inlet port 13 is opened such that liquefied gas in the left liquefied-gas container may enter the first pressure-reduction chamber 11, while the right inlet port 13 is closed. When the left liquefied-gas container is running low on liquefied gas, an indication member 63 is pivoted to appear in a window 21 for reminding the user.

A first membrane 5 is provided in the first pressure-reduction chamber 11 to cover the first opening 32, such that liquefied gas in the first pressure-reduction chamber 11 is not able to enter the upper cover 2 via the first opening 32. Similarly, a second membrane 123 is provided in the second pressure-reduction chamber 12 to cover the second opening 34, such that liquefied gas in the second chamber 12 is not able to enter the upper cover 2 via the second opening 34.

The structure described above is the same as that of conventional two-stage gas regulators (see FIGS. 6 and 7) and thus will not be further described. Nevertheless, in order to realize the advantages of the present design, one has to know the shortcomings of conventional two-stage gas regulators.

Figure 6:
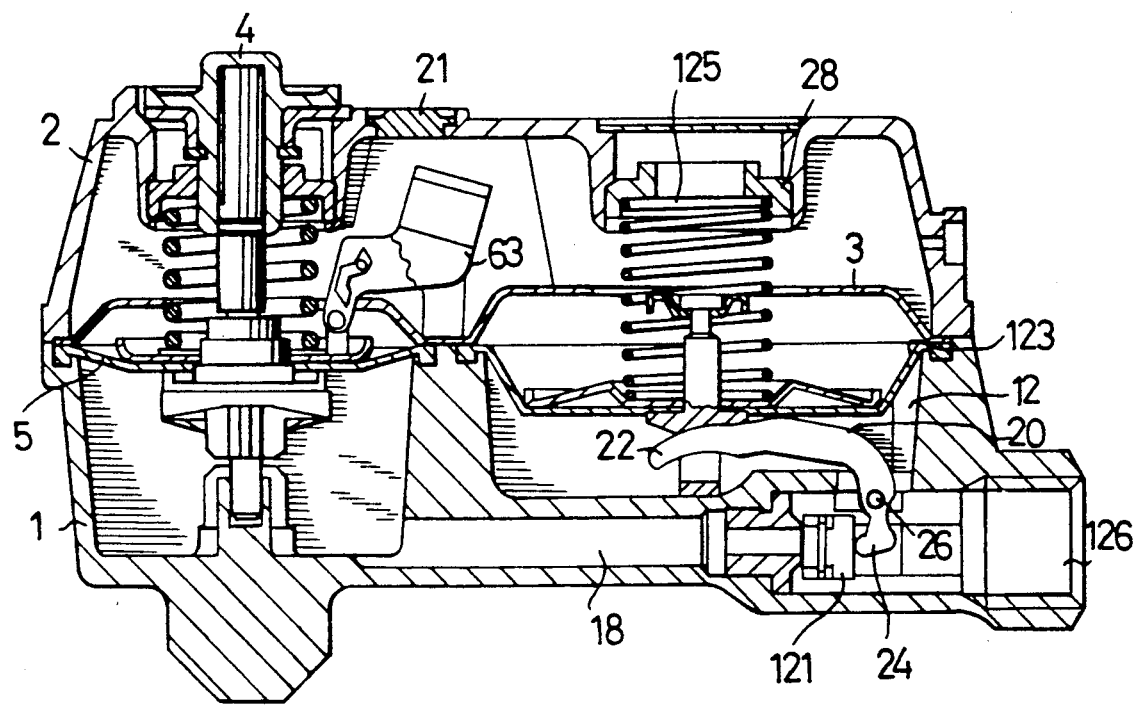
FIG. 6 is a cross-sectional view showing a conventional two-stage gas regulator for liquefied-gas containers, wherein a second pressure-reduction chamber is not in fluid communication with a first pressure-reduction chamber.
Figure 7:
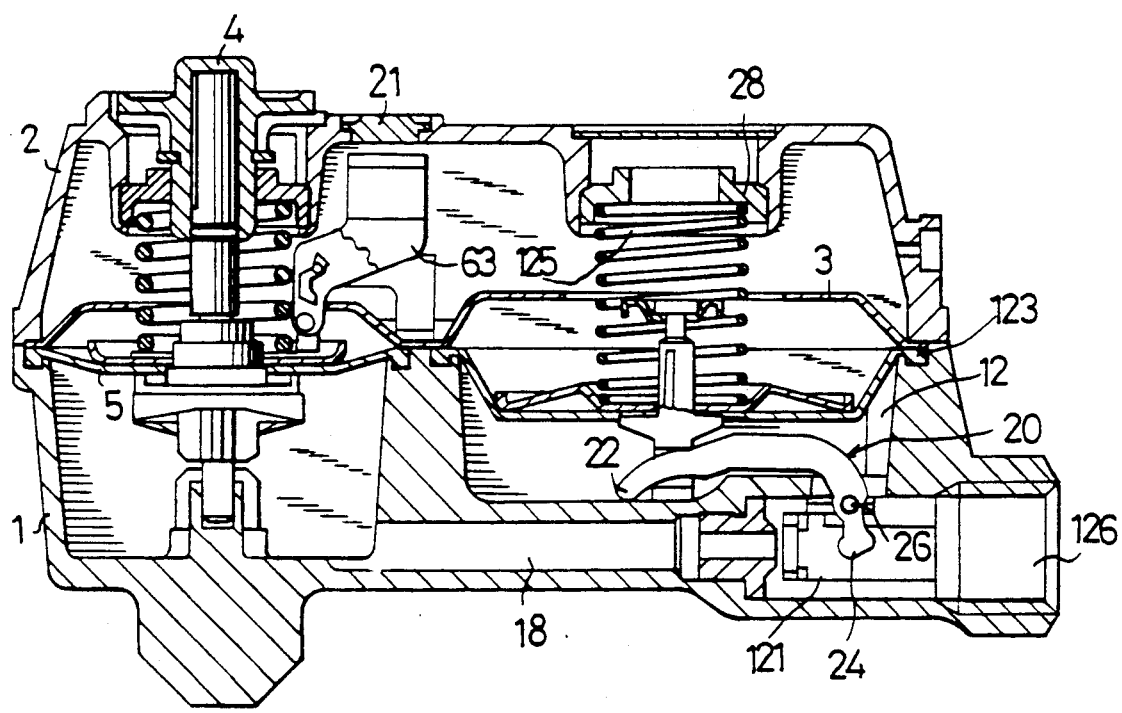
FIG. 7 is a cross-sectional view of the conventional two-stage gas regulator in FIG. 6, wherein the second pressure-reduction chamber is in fluid communication with the first pressure-reduction chamber.

FIGS. 6 and 7 show a conventional two-stage gas regulator. Referring to FIG. 6, a receptacle 28 is formed at an inner side of the upper cover 2 for receiving a first end of spring 125 whose first end is located on an upper side of the second membrane 123. Before opening the liquefied-gas container, the two-stage gas regulator is in an initial status as shown in FIG. 6. When liquefied gas enters the first pressure-reduction chamber 11 via the corresponding inlet port 13, pressure of the liquefied gas is reduced to a pre-determined value (e.g., 10 psi). Thereafter, the preliminarily pressure-reduced liquefied gas passes through the channel 18 to push the block 121 rightward to block the outlet port 126, preventing inappropriately pressure-reduced liquefied gas from exiting the two-stage gas regulator. The preliminarily pressure-reduced liquefied gas enters the second pressure-reduction chamber 12 to proceed with a secondary pressure reduction (cf. FIG. 7).

After the liquefied gas fills the second pressure-reduction chamber 12 (which means the secondary pressure reduction is completed), the second membrane 123 moves upward, thereby compressing the spring 125 and lifting a first arm 22 of a lever 20 which has a pivot shaft 26. A second arm 24 of the lever 20 is then urged to move the block 121 leftward, allowing the pressure-reduced liquefied gas to exit the two-stage gas regulator via the outlet port 126, in which the pressure of the liquefied gas is at a predetermined value (e.g., 2 psi). After that, the spring 125 urges the second membrane 123 to move downward to a position shown in FIG. 6. Such a procedure continues until the liquefied-gas containers run out of liquefied gas.

Nevertheless, if the first membrane 5 is worn, liquefied gas in the first pressure-reduction chamber 11 enters the upper cover 2 and fills the space in the upper cover 2. The pressure of the liquefied gas in the upper cover 2 acts on an upper side of the second membrane 123, such that the second membrane 123 is not able to move upward. Accordingly, the block 121 cannot be moved leftward by the second arm 24 of the lever 20. The liquefied gas exits the outlet port 126 at a pressure above 2 psi (the pre-determined value), for example, 5 psi. In other words, although the pressure of the liquefied gas has been reduced, the pressure of the liquefied gas is still too high when leaving the outlet port, which results in potential risks to property and lives.

Figure 4:
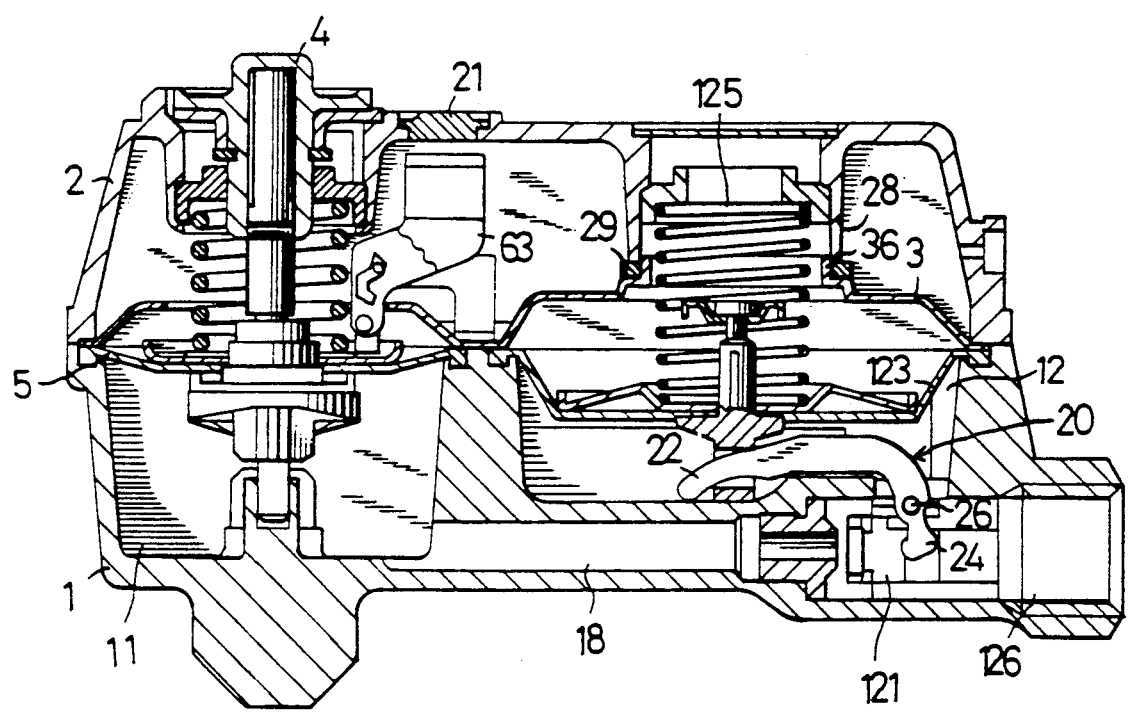
FIG. 4 is a cross-sectional view similar to FIG. 3, wherein the second pressure-reduction chamber is in fluid communication with the first pressure-reduction chamber.

Referring now to FIGS. 2 through 4, the present invention is characterized by a flange 36 protruding upward from a periphery of the second opening 34, and the receptacle 28 extending downward to receive the flange 36. In addition, a seal 29 is provided around the flange 36, such that fluid in the upper cover 2 is not able to enter the second pressure-reduction chamber 12. It is clear that even though the first membrane 5 is worn, which causes liquefied gas to leak into the upper cover 2, the second membrane 123 does not malfunction, since the liquefied gas does not act on the upper surface of the second membrane. Although it is a small modification of providing such a sealing means, it is appreciated that the potential damage to property and injury to lives are prevented.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. In a two-stage gas regulator for liquefied-gas containers comprising a lower body and an upper cover with a mediate plate disposed therebetween, said lower body having a plurality of inlet ports, a first pressure-reduction chamber, a second pressure-reduction chamber, and an outlet port, said mediate plate having a first opening and a second opening respectively in alignment with said first and second pressure-reduction chambers, a first membrane being provided in the first pressure-reduction chamber to cover the first opening, a second membrane being provided in the second pressure-reduction chamber for operating a secondary pressure reduction for the liquefied gas in cooperation with a spring disposed between said second membrane and a receptacle formed in said upper cover, the improvement comprising:

a flange protruding upward from a periphery of said second opening and being received in said receptacle, and a seal being provided around said flange for preventing fluid in said upper cover from entering said second pressure-reduction chamber.

* * * * *